United States Patent [19]
Oszlár et al.

[11] Patent Number: 4,506,130
[45] Date of Patent: Mar. 19, 1985

[54] METHOD AND APPARATUS FOR ELECTROSLAG WELDING

[75] Inventors: Imre Oszlár; András Beck, both of Budapest; Gábor Mohácsi, Dunaharaszti, all of Hungary

[73] Assignee: Csepel Müvek Egyedi Gëpgyära, Hungary

[21] Appl. No.: 466,314

[22] Filed: Feb. 14, 1983

[30] Foreign Application Priority Data

Mar. 1, 1982 [HU] Hungary .................................. 614/82

[51] Int. Cl.³ ............................................ B23K 25/00
[52] U.S. Cl. .................................. 219/73.1; 219/130.5
[58] Field of Search ...................... 219/73.1, 73.2, 73, 219/130.5

[56] References Cited

U.S. PATENT DOCUMENTS 3,594,538 7/1971 Broodman ........................... 219/73.1
3,975,614 8/1976 Toth et al. ....................... 219/73.1 X

FOREIGN PATENT DOCUMENTS 48-00384 1/1973 Japan ................................. 219/73.1

Primary Examiner—Roy N. Envall, Jr.
Assistant Examiner—Catherine M. Sigda
Attorney, Agent, or Firm—McGlew and Tuttle

[57] ABSTRACT

A method of pool-slag welding is carried out in the well-known manner and arrangement, however, with determined altering current intensity and/or voltage. A control unit is used which is suitable for the pulsewise altering of the values of current intensity and/or voltage which are necessary for welding. Altering current intensity is carried out advantageously by regulating the speed of feeding of the welding filler wire. The method and apparatus makes the production of intermittent welds possible, which are of better quality, greater toughness and better impact strength than the welds produced by known methods and apparatus.

13 Claims, 2 Drawing Figures

METHOD AND APPARATUS FOR ELECTROSLAG WELDING

FIELD AND BACKGROUND OF THE INVENTION

The invention relates to a method of electroslag welding, comprising the known steps of assigning respective optimum values and value ranges to the width of a slot defined by workpieces to be welded and to a voltage and current range necessary for welding, setting up the workpieces with the slot of optimum width therebetween, closing the slot laterally, guiding a welding filler wire into the slot, connecting the welding filler wire and a workpiece to respective poles of a suitable current source and carrying out welding by feeding the welding filler wire into the slot after having switched on the current source. The invention relates further to an apparatus for electroslag welding, particularly for carrying out the proposed method, comprising a current source connected by its poles to workpieces separated by a slot and to a welding filler wire and further comprising a feeder for guiding the welding filler wire into the slot. By the inventive process and apparatus of electroslag welding, an intermittent weld can be produced which does not need heat treatment for assuring good quality.

Electroslag welding is a process for obtaining intermittent welds of great thickness in one technological step or pass. While producing an intermittent weld between workpieces of great thickness, it is advantageous to use the method of electroslag welding, because in this way, it is possible to provide a good weld along a workpiece of 3 meters thickness in one technological pass, whereas the method of the more commonly used arcwelding renders this possible only by repeated passes of the welding electrodes along the workpiece. For performing electroslag welding the workpieces to be welded should be arranged at a determined distance from each other depending upon the workpiece and the planned welding conditions. In this way, a vertical slot is defined. The welding filler wire to be guided into the slot and the workpieces as well are connected to respective poles of a current source. The welding filler wire should be guided into the slot in such a manner that it has no metallic content with the workpieces during feeding in the beginning. The welding filler wire is fed in the slot as far as possible until an electric arc is established between the wire and the workpiece or a metallic bottom plate connected to the workpieces. The electric arc results in the melting of the filler wire and the bottom plate and in the production of a metallic molten pool. Hereupon, slag-forming powder is fed onto the metallic molten pool. The power melts and therefore becomes electrically conductive and chokes the electric arc. Slag-forming powder can be added as an insulating coating formed on the welding filler wire or on a tube for guiding it. The molten pool of slag prevents the electrical current from igniting an electric arc, and the molten slag ensures heat transfer and melting of the surface layer of the workpieces next to the slag so that welding occurs by the hot slag.

Through this welding process an intermittent weld of great mass which is similar to a column, is produced. Also several welding filler wires can be applied if required. The current rate per filler wire is commonly in the range of 500 to 800 A. It is preferred to use units with flat current-voltage characteristics as the current source, since they are relatively easy to adjust. In the case where such supply units are used, the current intensity can be well adjusted by regulating a feeding rate of the welding filler wire while the voltage value can be controlled in the current source. Up to the present, endeavors have been made to ensure, in a continuous way, constant values of current intensity and voltage of the electroslag welding because in this way the main features of the electroslag welding process are a uniform increase of the intermittent weld and a homogeneous characteristic to the weld.

One of the main problems of welding is the quality of the intermittent weld, that is the welded joint. The intermittent welds of great mass on one technological pass by electroslag welding are generally rigid and their impact strength and toughness are not satisfactory, therefore heat treatment or the application of other quality improving processes is needed. For example, the intermittent welds between workpieces of 30 mm thickness made of unalloyed structural steel are produced in general by current of the 500 to 600 A range and voltage of the 34 to 36 V range when using the method of electroslag welding. The impact strength of the intermittent weld formed in this way rarely exceeds the value of 40 J (joule) at room temperature (18° to 20° C.). At 0° C. it comes generally 20 J, and at −10° C. it remains under 10 J. The characteristic value of 35 J can be generally ensured only in a temperature range over room temperature. The mentioned disadvantageous features follow from the poor quality of the crystal structure of the intermittent weld.

In methods of electric arc welding, it is well known to use synchronous pulsating current and voltage during welding. Pulsating these parameters renders welding easier and permits vertical welding, the welding of thin plates, controlled zone melting of a seam and the like. The crystal structure of the intermittent weld can be improved in such a manner if required, however, pulsating is suitable for adjusting heat introduction, too.

The intermittent welds of large thickness which are produced by electric arc welding, are of good quality since they are influenced advantageously by welding in repeated lines, whereby each repetition (each new welding deposit) heat-treats the preceding line. In the method of electroslag welding, however, such a direct heat-treating effect has been unknown as for, although in view of quality of the intermittent weld, that is its low toughness, improving it is often required.

The use of a heat-treatment to improve weld qualities is high-priced and requires high energy consumption, because the welded workpieces of great mass should be reheated to a well determined temperature range. According to another well-known method the workpiece is produced of a material to which alloying components have been selected according to requirements of subsequent welding. The same relates to the welding filler wire, too. All these solutions cause an increase in cost and technological significance of the production.

Other quality improving methods have remained at the level of technological proposals. Examples of these are applying vibration during welding, irradiation by ultrasound or gamma-radiation, reheating with guided flame or by induction, or applying a magnetic field. The mentioned solutions are characterized by little efficiency and eventually by relatively high costs of performance, therefore quality improvement is usually achieved exclusively by the method of alloying and heat-treatment.

SUMMARY OF THE INVENTION

The aim of the invention is to provide a process of, and an apparatus for improving the properties of the electroslag intermittent weld which, as compared to known solutions, ensures a simple, less expensive and more efficient improvement of quality in the intermittent weld.

The invention is based on the recognition that altering current intensity and/or voltage during the welding process influences the electroslag welding process in an advantageous manner and it is suitable to produce intermittent welds of favorable crystal structure which do not need heat-treatment.

On the basis of the above-mentioned recognition, a method of electroslag welding has been elaborated, according to which the following steps are performed: assigning respective optimum values and value ranges to the width of a slot defined between workpieces to be welded and to voltage and intensity of current necessary for welding, setting up the workpieces and ensuring thereby a vertical slot of the optimum width, closing laterally the slot, guiding a welding filler wire into the slot, connecting the welding filler wire and the workpieces to respective poles of a current source applied for ensuring the optimum value range of voltage and current intensity, feeding the welding filler wire into the slot after switching on the current source and altering current and/or voltage in the course of the welding process by pulsation in the optimum range in such a way as to ensure the optimal crystal structure of the intermittent weld to be produced between the workpieces. Altering the mentioned values is advantageously performed periodically.

The process according to the invention can be advantageously carried out in such a manner that during alteration the way of current from current source to the workpiece or to the welding filler wire is briefly and if required periodically interrupted.

In another advantageous embodiment of the inventive method, altering current intensity is ensured by regulating feeding speed of the welding filler wire.

In a further advantageous embodiment of the method, the values of current intensity and of voltage, or rather the duration of the current and voltage impulses respectively are changed independently of each other. Alteration of the respective values can be ensured also in a synchronous manner whereby increasing of the current involves a determined manner of increasing or decreasing voltage, or if required decreasing of the current involves a determined manner of increasing or decreasing voltage.

To achieve the method described above, an apparatus for electroslag welding has also been developed, which comprises a current source connected by its poles to workpieces and a welding filler wire and a feeder for guiding the welding filler wire in a vertical slot separating the workpieces, wherein the current source includes a control unit for pulsewise altering current intensity and/or voltage according ot the welding conditions, and the control unit is connected to the feeder to control it. In an advantageous embodiment of the apparatus, the control unit is suitable for interrupting the current path beween the welding filler wire or the workpiece and the current source.

Applying the method and apparatus according to the invention, electroslag welded intermittent welds of very good quality can be produced, the toughness of which are considerably higher than those of intermittent welds produced by known method of and apparatuses for electroslag welding, even without heat-treatment.

BRIEF DESCRIPTION OF THE DRAWINGS

The invention is further described, merely by way of example, with reference to preferred embodiments illustrated in the accompanying purely schematic drawings, wherein.

DESCRIPTION OF THE PREFERRED EMBODIMENTS

Figure 1:
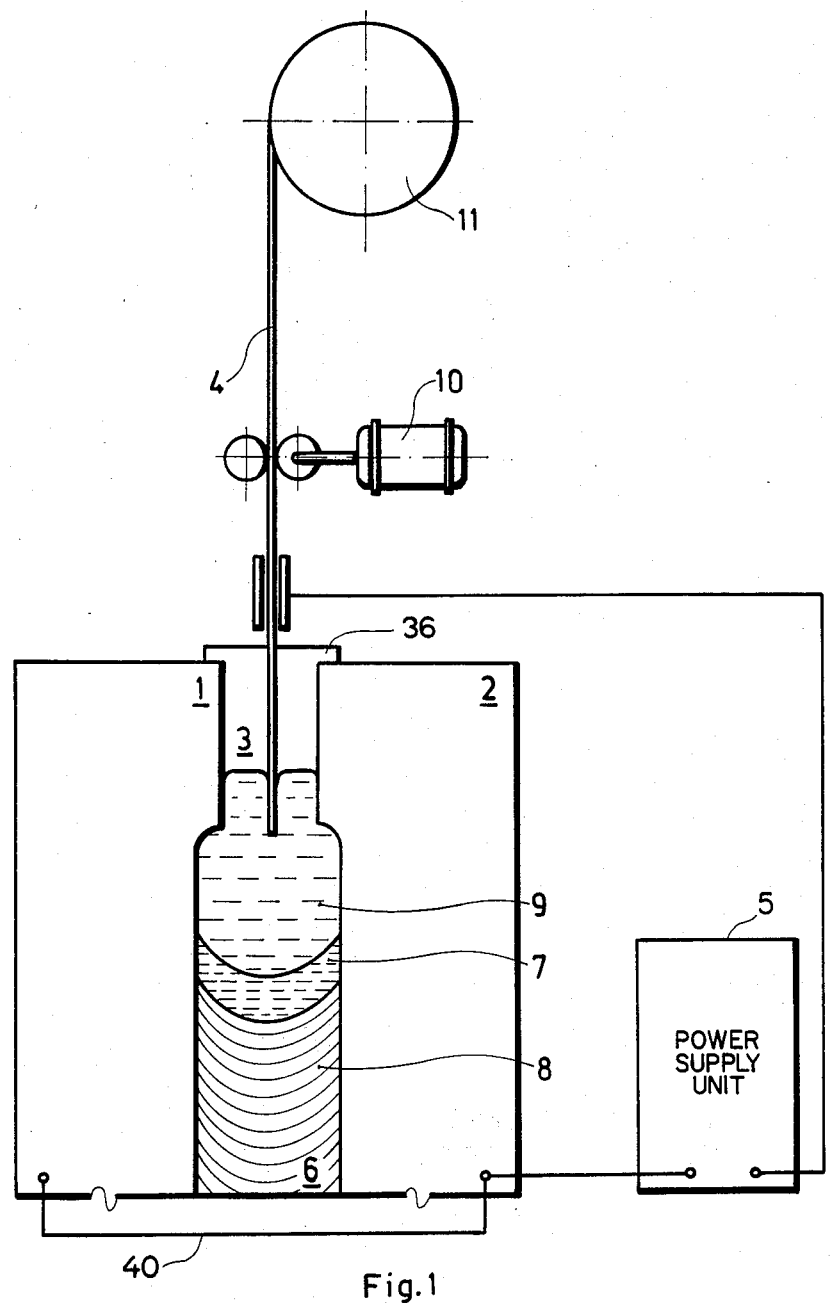
FIG. 1 is the fundamental scheme for electroslag welding.

When performing the method of electoslag welding in general, as shown in FIG. 1, workpieces 1 and 2 are arranged in such a manner that between them a vertical slot 3 is formed, the width of which is chosen according to known principles. In the case of unalloyed structural steel of 30 mm thickness the slot 3 should have, for example, a width of about 25 mm. A welding filler wire is introduced into the slot 3, from a wire coil 11 by means of a motor 10. The welding filler wire 4 is connected to one of the electrical supply poles of a direct current or an alternating current supply unit 5. At least one of the workpieces 1 and 2 is connected to the other electrical supply pole of the supply unit 5. The slot 3 is closed laterally along its vertical line, for example by means of a cooled copper bracket 36 connected at the same time, if required, to both workpieces 1 and 2. At the bottom of the slot 3, a metallic plate 40 connected electrically to the workpiece 1 and 2 is placed or formed. At the beginning of the process the welding filler wire 4 is fed into the slot 3 so as to establish electrical contact with the mentioned plate. In this way, an electric arc comes into being under influence of which the surface layer of the plate and the end of welding filler wire 4 melt, forming molten pool 7, on the surface of which a molten slag layer 9 is prepared by a known method. The molten slag layer 9 covers the molten pool 7 and chokes the electric arc. After choking the arc, current continues flowing through the molten slag layer 9. At this moment, the process of electroslag welding starts. Under influence of the Joule effect accompanying the current pasage, the molten slag layer 9 gets hot to a temperature, whereby material of the surface layer of the workpieces 1 and 2 melts along the slot 3. Under the layer of molten metal an intermittent weld 6 is built up by means of heat exchange effect with surrounding metal (eventually increased by the copper bracket). Between the intermittent weld 6 and the molten pool 7 there is a boundary 8 which is of determinant importance for the quality of the intermittent weld 6. The shape of the boundary 8 depends on voltage and current provided by the supply unit 5. While no current is flowing the boundary 8 is a horizontal layer. With increasing current the shape of the boundary becomes paraboloid with increasing depth. While applying a current with intensity which is stable in time, the intermittent weld 6 is built up along a quasiparaboloid surface extending from below upwards along the vertical line of the slot 3. The paraboloid surface is characterized by a width which increases with increasing voltage. At increasing voltage, the paraboloid surface part becomes wider and shallower. Also feeding welding filler wire 4 can be suitable for influencing the shape of the boundary 8, because current intensity is a well determinable function of the feed rate. At greater feed rate, the current value can be increased and vice versa. This is while using a supply unit 5 having a flat characteristic.

The very essence of the method proposed according to the invention is that the shape of the transition domain between the boundary 8 and the intermittent weld 6 is repeatedly changed to cause recrystallization of material being already solidified and to advantageously influence, in this way, the crystal structure. The value range of current and/or voltage of the supply unit 5 is chosen in such a manner as to ensure the possibility of altering current and/or voltage in a controlled manner, namely by pulsation of one or both according to necessity. While altering the mentioned values by a pulsation, the shape of the boundary 8 changes continuously and thereby the required effect can be achieved. Pulsation can be advantageously carried out in a periodical manner, namely the same pulsations are periodically repeated. The range of current and/or voltage is a nonzero one, that is, at least some current and/or some voltage flows throughout the range.

In the known methods of electroslag welding, requirements of the supply unit 5 include relative stability of voltage and current and continuity of current supply as well. Stability means that fluctuation of the current and voltage values are as small as possible during welding. The respective values are determined from results of experimental tests giving generally one range for each kind of material of the workpieces to be welded.

According to the invention, the value of current and voltage or that of one of them should be changed in time, in a pulsewise or pulsating manner.

For example, as experience has shown, it is advantageous to maintain, in the case of unalloyed construction steel, a constant current intensity value while using, as the voltage, the value $U_1$ for time $t_1$ and the value $U_2$ for time $t_2$ alternatively, wherein $U_1$ differs from $U_2$.

According to another solution the voltage value remains constant, while the current intensity value changes in determined periods between limits $I_1$ and $I_2$. The difference between the bottom and the top values of the pulsation range is in general about 15 percent or it may be greater. A further possibility lies in that alteration of current and voltage values occur according to different time functions, following the requirements: for example, voltage has value $U_1$ for time $t_1$ and $U_2$ for time $t_2$, parallelly and independently thereof, current intensity has value $I_1$ for time $t_3$ and value $I_2$ for time $t_4$, wherein the time intervals $t_1$, $t_2$, $t_3$, $t_4$, the current intensity values $I_1$ and $I_2$, the voltage values $U_1$ and $U_2$ are chosen according to the conditions of electroslag welding and need not have equal values. The time intervals $t_1$, $t_2$, $t_3$ and $t_4$ may differ from each other, however, it may be suitable to choose synchronous alteration with values $t_1=t_3$ and $t_2=t_4$. While ensuring synchronous alteration, it is possible also to increase voltage synchronously with increasing or decreasing current intensity. The possibilities should be proven by welding and a choice should be made according to the actual conditions.

Advantageous conditions of welding can also be ensured by interrupting the supply of welding from the current source many times subsequently, each time for a determined short period. When interrupting the current supply, feeding of welding filler wire 4 should not be stopped, but the duration, frequency and time points of interruption are to be chosen in such a manner as to ensure melting material of the welding filler wire 4 into the molten pool 7 and forming constantly the advantageous structure of the intermittent weld 6. By interrupting the current path, the heat transfer conditions are altered under the influence of streaming of the molten material, whereby the structure and shape of the boundary 8 varies. It has been proven to be advantageous, for instance, to interrupt each approximatley 10 second long pulsation period of current intensity several times subsequently for one second.

For verification of the advantageous features of the method, electroslag welding of several materials has been carried out in embodiments known from the previous description. From among these, the following examples specify the circumstances and conditions of the invention. For welding, as is usual, a welding filler wire 3 of 3 mm diameter is used and as a current source a current supply of 1500 A is used which has flat characteristics. The current source is adapted in such a manner that it can provide the required pulsation of voltage and feed rate for the welding filler wire, respectively. For the purpose of comparison, samples were made of given materials according to the known methods of electroslag welding, namely, by application of stable values of current intensity and voltage, with continuous flow of current, which samples all show, at room or higher temperature the characteristic impact strength value of 35 J.

EXAMPLE 1

Welding of unalloyed structural steel of 30 mm thickness is carried out by applying a 3 mm thick welding filler wire. At the beginning, the flow of direct current is established at an intensity of about 500 A, and in the meantime, the voltage fluctuates between 31 and 35 V in such a manner that the 31 V value is maintained for 3 seconds and the 35 V value for the next 3 seconds. By testing the obtained intermittent weld it can be determined that its impact strength limit value of 35 J can be reached already at a temperature of $-20°$ C.

EXAMPLE 2

In an arrangement according to Example, current intensity is altered between 500 A and 800 A synchronously to the voltage alteration. The smaller values of 31 V and 500 A are maintained for 15 seconds and the greater ones of 36 V and 800 A for 12 seconds alternatively. It was proved on the obtained intermittent weld that its impact strength is similar to that of the previously tested weld.

EXAMPLE 3

Welding of unalloyed structural steel of 100 mm thickness is carried out also under applying welding filler wires of 3 mm diameter. In view of the great thickness of material to be welded it is suitable to apply two welding filler wires connected parallel to the same pole as the current source and fed into the slot by a common motor. Carrying out electroslag welding of such a material of the mentioned thickness according to the known methods has never succeeded in obtaining the characteristic value of 35 J impact strength even at room temperature. However, when altering voltage between the limits of 42 and 48 V and synchronously current intensity between the limits 800 and 1300 A, namely maintaining the lower values for 10 seconds and the higher values for 8 seconds, an intermittent weld can be produced, which has an impact strength of 35 J at a temperature of 0° C. The tests show that it is advantageous to interrupt current sometimes for 1 second on each cycle of alteration.

According to preliminary analysis of the obtained results, when welding workpieces of greater thickness as mentioned, it can be suitable to feed the welding filler wires with respective different feeding rates.

As supply unit 5, is is advantageous to choose a unit with flat current-voltage characteristics because the regulation of voltage and of current intensity can be carried out in the supply unit 5 in a known, very advantageous manner, i.e. by guiding the welding filler wire 4 into the slot 3 with speed which alters in time. Of course, using supply units of another characteristic, is is required to use other methods of adjustment.

Figure 2:
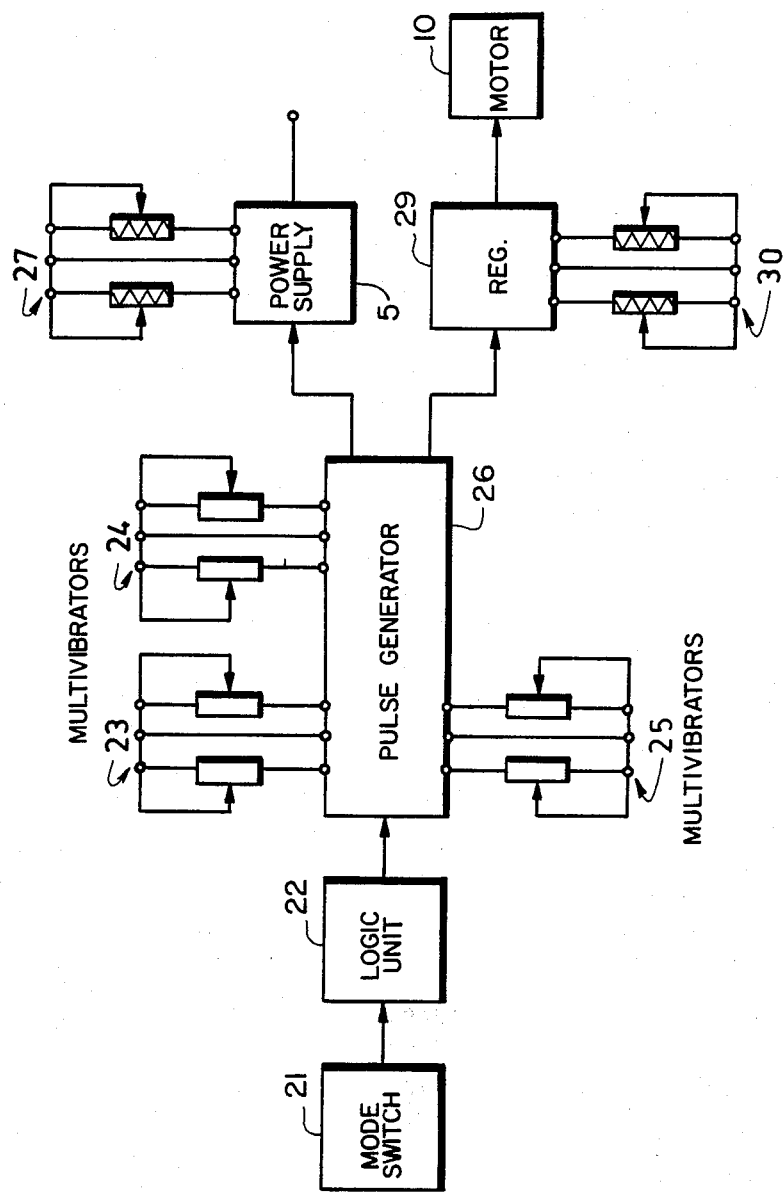
FIG. 2 is the block diagram of the apparatus according to the invention.

The supply unit 5 of the apparatus, as shown in FIG. 2 and which is suitable also for realizing the inventive method, is connected to a control unit comprising a switch 21 for selecting mode of operating, a logic unit 22 and a pulse generator 26 connected in series, wherein the pulse generator 26 is connected to astable multivibrators 23, 24, 25 and in parallel connection with a regulator 29 regulating the motor 10 and with the supply unit 5. Respective potentiometric units 27 and 30 are assigned to the supply unit 5 and to the regulator 29.

The control unit according to FIG. 2 operates in the following way. The required mode of operating is chosen by the switch 21. The logic unit 22 ensures the required mode of operating of the supply unit 5 and of the regulator 29 according to the mode set. By means of the astable multivibrators 23, 24, 25 the period duration belong to the lower and higher values of current intensity and voltage and the duration and frequency of interruption can be adjusted, respectively. According to the adjusted values, the potentiometric unit 27 ensures alteration of voltage and the potentiometric unit 30 alteration of current intensity, the last by changing the feeding rate of the welding filler wire 4 through speed of rotation of the motor 10 during determined periods.

The pulse generator 26 can be provided with further astable multivibrators, too. These further units are suitable, for example, to operate regulators similar to that denoted by 29 and connected in parallel to it, if a higher number of welding filler wires 4 are provided, with possibility of separated regulation of their feed rates.

By means of the method and apparatus according to the invention, as compared with known methods and apparatus, intermittent welds of better quality, higher toughness, and better impact strength can be produced.

The field of protection defined by the claims is not of course restricted to the preferred embodiments described and illustrated purely by way of example. The invention is applicable to any system of technology applying the method of electroslag welding.

What we claim is:

1. A method of electroslag welding two workpieces together, comprising:
   selecting an optimum value for the width of a vertical slot to be provided between the two workpieces;
   selecting a non-zero value range for a plurality of electrical parameters necessary for welding the workpieces together;
   arranging the workpieces to establish the slot with said width of optimum value therebetween, said slot extending vertically between the workpieces;
   laterally closing said slot;
   guiding at least one welding filler wire into said slot;
   providing a supply unit capable of supplying said plurality of electrical parameters in said value range, said supply unit having at least two electrical power supply poles;
   connecting one of the poles of the supply unit to said at least one welding filler wire;
   connecting at least one of the two workpieces to another pole of the supply unit;
   activating the supply unit for supplying the plurality of electrical parameters between the at least one workpiece and said welding filler wire;
   feeding said welding filler wire in the slot; and
   simultaneously with said feeding of said welding filler wire, pulsating by altering at least one of said electrical parameters within said value range in pulses lasting several seconds so that an optimal crystal structure of an intermittent weld formed in said slot is produced.

2. A method according to claim 1, wherein said parameters comprise voltage and current.

3. A method according to claim 2, including momentarily interrupting the welding current.

4. A method according to claim 3, wherein said welding current is interrupted periodically.

5. A method according to claim 2, including interrupting the welding current and altering the welding voltage within said selected range, the current and voltage being changed independently of each other.

6. A method according to claim 2, wherein an intensity of welding current and welding voltage are altered in synchronism with each other.

7. A method according to claim 2, including altering an intensity of the welding current by altering a speed of feeding of said welding filler wire in said slot.

8. A method according to claim 2, wherein said non-zero value range for welding current is from 500 to 1,300 A and for welding voltage is from 31 to 48 V.

9. An apparatus for electroslag welding two workpieces together which have a vertical slot formed therebetween having a selected optimum width, comprising:
   means for feeding a welding filler wire into the slot at a feed speed;
   a power supply unit having at least two electrical power supply poles, one pole connected to said means for feeding a welding filler wire, for applying a voltage and current to the welding filler wire, another pole adapted for connection to at least one of the two workpieces; and
   control means connected to said means for feeding a welding filler wire and to said power supply unit for altering, in pulsewise fashion, at least one of the current, voltage and feed speed during application by said power supply unit of sufficient voltage and current to establish welding between the two workpieces, control means comprising means for selecting a mode of operation, a logic unit and means for generating pulses connected in series, said means for generating pulses being equipped with respective outputs connected to said power supply unit and to means for adjusting the feed speed in said means for feeding the wire;

whereby an optimal crystal structure of an intermittent weld formed between the two workpieces is established in the vertical slot.

10. An apparatus according to claim 9, wherein said control means includes means for establishing timed and periodic interruptions of current supplied by said power supply unit to the wire and at least one workpiece.

11. An apparatus according to claim 9, wherein said control means includes at least one astable multivibrator for establishing periodic alterations of at least one of the current, voltage and feed speed.

12. An apparatus according to claim 9, wherein said control means comprises means for altering at least two feed speeds, said means for feeding including means for feeding at least two welding filler wires in parallel to each other in the slot.

13. An apparatus according to claim 9, wherein said control means controls said power supply unit to alter current within the range of 500 to 1,300 A and voltage within the range of 31 to 48 V.

* * * * *